(12) United States Patent
Liu (10) Patent No.: US 12,403,946 B2
(45) Date of Patent: Sep. 2, 2025

(54) TIPCART

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 115 days.

(21) Appl. No.: 17/923,577

(22) PCT Filed: Aug. 3, 2021

(86) PCT No.: PCT/CN2021/110198
§ 371 (c)(1),
(2) Date: Nov. 5, 2022

(87) PCT Pub. No.: WO2022/257255
PCT Pub. Date: Dec. 15, 2022

(65) Prior Publication Data
US 2024/0317288 A1    Sep. 26, 2024

(30) Foreign Application Priority Data

Jun. 11, 2021   (CN) .......................... 202121307491.6

(51) Int. Cl.
*B62B 3/08*    (2006.01)
*B60P 1/04*    (2006.01)
*B60P 1/28*    (2006.01)

(52) U.S. Cl.
CPC ................. *B62B 3/08* (2013.01); *B60P 1/04* (2013.01); *B60P 1/28* (2013.01)

(58) Field of Classification Search
CPC ......... B62B 3/08; B62B 3/04; B62B 2203/07; B62B 2203/10; B62B 5/06;
(Continued)

(56) References Cited

U.S. PATENT DOCUMENTS 2,466,791 A * 4/1949 Cook ........................ B60P 1/28
298/17 R
3,336,080 A * 8/1967 Heck ........................ B60P 1/18
298/17.5
(Continued)

FOREIGN PATENT DOCUMENTS

CN    201882120 U    6/2011
CN    205440460 U    8/2016
(Continued)

*Primary Examiner* — Amy R Weisberg
*Assistant Examiner* — Philip Charles Adams
(74) *Attorney, Agent, or Firm* — Birchwood IP (57) ABSTRACT

A tipcart, comprising a frame, a dump box hinged on the frame, and a first pin shaft for connecting the frame and the dump box, a front wheel bracket and a rear wheel bracket are respectively fixedly connected under a front and rear ends of the frame, both ends of the front wheel bracket and the rear wheel bracket are respectively provided with a front wheel mounting shaft and a rear wheel mounting shaft, and wheels are mounted on both the front wheel mounting shaft and the rear wheel mounting shaft. The first pin shaft is arranged at the rear end of the frame, and the first pin shaft is located between the front wheel mounting shaft and the rear wheel mounting shaft.

8 Claims, 6 Drawing Sheets

(58) Field of Classification Search
CPC ....... B62B 2203/70; B62B 3/104; B62B 1/24; B62B 3/12; B62B 1/186; B62B 2205/20; B62B 2301/14; B65G 7/08; B65G 65/23; B65G 65/24; B65G 57/20; B65G 1/08; B65G 7/00; B60P 1/16; B60P 1/04; B60P 1/28; B60P 1/283; B60P 1/286; B60P 1/24; B60P 1/08; B60P 1/34; B60P 1/6418; B62D 1/12
USPC ........................................................ 298/17 R
See application file for complete search history.

(56) References Cited

U.S. PATENT DOCUMENTS

| | | | |
|---|---|---|---|
| 11,299,187 B2 * | 4/2022 | Foley | ........................ B62B 3/08 |
| 2002/0185833 A1 | 12/2002 | Schuerman et al. | |
| 2020/0247447 A1 | 8/2020 | Foley et al. | |

FOREIGN PATENT DOCUMENTS

| | | |
|---|---|---|
| CN | 207060112 U | 3/2018 |
| CN | 207257733 U | 4/2018 |
| CN | 207758853 U | 8/2018 |
| CN | 110116743 A | 8/2019 |
| CN | 110422099 A | 11/2019 |
| CN | 211001477 U | 7/2020 |
| CN | 212022761 U | 11/2020 |

* cited by examiner

TIPCART

CROSS-REFERENCE TO RELATED APPLICATIONS

This application is a U.S. continuation of co-pending International Patent Application No. PCT/CN2021/110198, filed on Aug. 3, 2021, which claims the benefit and priority of Chinese Patent Application Number 202121307491.6, filed on Jun. 11, 2021 with China National Intellectual Property Administration, the disclosures of which are incorporated herein by reference in their entireties.

TECHNICAL FIELD

The present application relates to the technical field of tipcarts, in particular to a novel tipcart.

BACKGROUND

Tipcart is a kind of vehicle for short-distance transportation of materials with tippable dump box. Due to its low cost, simple maintenance, convenient operation and wide application. It is suitable for short-distance transportation of sand, earth, coal, ore or other various bulk materials. It is a very practical transport device during the daily handling of objects. Most of the existing Tipcarts use a hinge shaft to connect the dump box to the frame. Since the dump box is usually made of a plastic-like integral molding material, the connection point with the hinge shaft is usually not resistant to wear. This leads to serious wear and tear of the connection points after frequent use of the dumping and dumping function, thus increasing the frequency of replacement of the dump box, and most of the existing tipcarts are designed be pushed by hand, which is inconvenient to use a trailer towing when heavier cargo is loaded in the cart.

Therefore, the existing technology still needs to be further developed and improved.

SUMMARY

In view of various deficiencies of the prior art, to solve the above problems, a novel tipcart is proposed. The present application provides the following technical solution:

A tipcart, comprising a frame, a dump box hinged on the frame, and a first pin shaft for connecting the frame and the dump box, a front wheel bracket and a rear wheel bracket are respectively fixedly connected under a front and rear ends of the frame, both ends of the front wheel bracket and the rear wheel bracket are respectively provided with a front wheel mounting shaft and a rear wheel mounting shaft, and wheels are mounted on both the front wheel mounting shaft and the rear wheel mounting shaft, the first pin shaft is arranged at the rear end of the frame, and the first pin shaft is located between the front wheel mounting shaft and the rear wheel mounting shaft.

Furthermore, the front wheel bracket and the rear wheel bracket are both U-shaped brackets, wherein the end of the rear wheel bracket is horizontally extended backward to form an extension frame for mounting the rear wheel mounting shaft.

Furthermore, the first pin shaft is arranged between the rear wheel bracket and the rear wheel mounting shaft.

Furthermore, a connecting plate is fixedly arranged under the rear end of the dump box, and left and right ends of the connecting plate extend downward to form a hinge plate, wherein the hinge plate is provided with a hinge hole, and the first pin shaft passes through the hinge hole to hinge the connecting plate and the frame, furthermore, the hinge hole is arranged in a middle position of the hinge plate.

Furthermore, the connecting plate is a frame structure with a hollow center.

Furthermore, a reinforcing rod is also fixedly connected between the rear wheel bracket and the frame, and the reinforcing rod, the rear wheel bracket and the frame are jointly enclosed to form a triangular support structure.

Furthermore, a handle for pushing and pulling the tipcart is also fixedly connected to the frame, and the handle comprises a connecting rod fixedly connected to the frame, an extension rod hinged on the end of the connecting rod, and a hand pull ring connected to the extension rod.

Furthermore, a positioning hole is provided under the hand pull ring, a mounting hole is provided on the extension rod, after a second pin shaft passes through the mounting hole and the positioning hole, the second pin shaft detachably fixes the hand pull ring on the extension rod, two sets of the mounting holes are arranged on the extension rod at intervals, and a distance between the two sets of mounting holes is not less than the height of the hand pull ring, the bottom of the hand pull ring is fixedly connected with a limiting rod, and a limiting hole is provided in the corresponding extension rod, and the limiting rod extends into the limiting hole so that the hand pull ring is slidably connected to the extension rod.

Furthermore, the lower part of the hand pull ring is rotatably connected with an extension rod, and the end of the extension rod is provided with a connection hole for connecting a trailer.

Furthermore, the front end of the dump box is provided with a handle for easily dumping the dump box, and a clip for clipping the dump box on the frame is recessed inwardly under the handle, a clip ring for connecting the clip is provided on the frame, the clip and the clip ring are fixedly connected in a detachable manner, and the handle and the dump box are hingedly connected by a third pin shaft, and a return spring for maintaining the handle in the clipping position is sleeved on the third pin shaft.

Beneficial Effects

1. By adding a connecting plate to the original tipcart, a connecting point between the connecting plate and the dump box is additionally provided, thereby reducing the friction strength of the hinge point at the dump box. The connecting plate is made of high-strength metal plate, which effectively extends the service life of the dump box;
2. By arranging the hinge hole in the middle position of the hinge plate, the connecting plate rotates with the rotation of the dump box, which is convenient for the dumping process to keep the dump box at least in a vertical state, which is convenient for dumping the goods in the dump box completely. It is helpful for the frame to reinforce and support the dump box extending out of the support range of the frame, further reducing the impact of the goods squeezing the dump box, and extending the service life of the dump box;
3. By arranging the hinged dump box and the first pin shaft of the frame between the front wheel mounting shaft and the rear wheel mounting shaft, the center of gravity of the tipcart is located between the two wheels when loading goods, so as to avoid overturning caused by uneven loading of goods in the dump box during unloading.

REFERENCE SIGNS

100, Frame; 110, Front wheel bracket; 111, Front wheel mounting shaft; 120, Rear wheel bracket; 121, Rear wheel mounting shaft; 122, Extension frame; 123, Reinforcing rod; 130, Connecting rod; 140, Extension Rod; 150, Hand pull ring; 160, Mounting hole; 170, Limiting rod; 180, Connecting hole; 190, First pin shaft; 200, Dump box; 210, Handle; 211, Clip; 212, return spring; 220, Clip ring; 300, Wheel; 400, Connecting plate.

DETAILED DESCRIPTION

In order to make those skilled in the art better understand the technical solutions of the present application, the technical solutions of the present application will be described clearly and completely below with reference to the accompanying drawings of the present application. Based on the embodiments in the present application, other similar embodiments obtained by those of ordinary skill in the art without creative work shall fall within the protection scope of the present application. In addition, the directional terms mentioned in the following embodiments, such as "up", "down", "left", "right", etc., are only the directions with reference to the drawings. Therefore, the directional terms used are used to illustrate rather than limit the present application.

Embodiment 1

As shown in FIG. 1-5, a novel tipcart comprises a frame 100, a dump box 200 hinged on the frame 100, and a first pin shaft 190 for connecting the frame 100 and the dump box 200, a front wheel bracket 110 and a rear wheel bracket 120 are respectively fixedly connected under a front and rear ends of the frame 100, both ends of the front wheel bracket 110 and the rear wheel bracket 120 are respectively provided with a front wheel mounting shaft 111 and a rear wheel mounting shaft 121, and wheels 300 are mounted on both the front wheel mounting shaft 111 and the rear wheel mounting shaft 121, the first pin shaft 190 is arranged at the rear end of the frame 100, and the first pin shaft 190 is located between the front wheel mounting shaft 111 and the rear wheel mounting shaft 121. By arranging the hinged dump box 200 and the first pin shaft 190 of the frame 100 between the front wheel mounting shaft 111 and the rear wheel mounting shaft 121, the center of gravity of the tipcart is located between the two wheels 300 when loading goods, so as to avoid overturning caused by uneven loading of goods in the dump box 200 during unloading.

Furthermore, the front wheel bracket 110 and the rear wheel bracket 120 are both U-shaped brackets, wherein the end of the rear wheel bracket 120 is horizontally extended backward to form an extension frame 122 for mounting the rear wheel mounting shaft 121. The vertical U-shaped bracket can avoid interference with the wheels 300 or the frame 100 during the dumping process of the dump box 200. A triangle plate for strengthening the connection strength is also fixedly connected between the extension frame 122 and the rear wheel bracket 120, so as to strengthen the connection strength between the extension frame 122 and the rear wheel bracket 120.

Furthermore, the first pin shaft 190 is arranged between the rear wheel bracket 120 and the rear wheel mounting shaft 121. The length of the extension frame 122 is as small as possible, but the position of the first pin shaft 190 should be located between the rear wheel bracket 120 and the rear wheel mounting shaft 121, wherein during the dumping of the dump box 200, the gravity of which moves down into a triangular area formed by the rear wheel bracket 120, the rear wheel mounting shaft 121 and the first pin shaft 190, so as to share the pressure on the first pin shaft 190 and extend the service life of the first pin shaft 190.

Furthermore, a connecting plate 400 is fixedly arranged under the rear end of the dump box 200, and left and right ends of the connecting plate 400 extend downward to form a hinge plate, wherein the hinge plate is provided with a hinge hole, and the first pin shaft 190 passes through the hinge hole to hinge the connecting plate 400 and the frame 100. By adding a connecting plate 400 to the original tipcart, a connecting point between the connecting plate 400 and the dump box 200 is additionally provided, thereby reducing the friction strength of the binge point at the dump box 200. The connecting plate 400 is made of high-strength metal plate, which effectively extends the service life of the dump box 200.

Furthermore, the hinge hole is arranged in a middle position of the hinge plate. The rear end of the dump box 200 is arranged to protrude from the frame 100. By arranging the hinge hole in the middle position of the hinge plate, the connecting plate 400 rotates with the rotation of the dump box 200, which is convenient for the dumping process to keep the dump box 200 at least in a vertical state, which is convenient for dumping the goods in the dump box 200 completely. It is helpful for the frame 100 to reinforce and support the dump box 200 extending out of the support range of the frame 100, further reducing the impact of the goods squeezing the dump box 200, and extending the service life of the dump box 200.

Furthermore, the connecting plate 400 is a frame structure with a hollow center. The frame structure is light in weight, and can well complete the supporting and fixing function.

Furthermore, the wheel bracket comprises a front wheel bracket 110 and a rear wheel bracket 120, a reinforcing rod 123 is also fixedly connected between the rear wheel bracket 120 and the frame 100, and the reinforcing rod 123, the rear wheel bracket 120 and the frame 100 are jointly enclosed to form a triangular support structure. Since the frame 100 and the wheel bracket are only fastened and connected by fasteners such as bolts, and the rear wheel bracket 120 also serves as a turning support point, loosening may occur due to frequent sudden force during long-term dumping process. The rear wheel bracket 120 and the vehicle frame 100 are connected triangularly by adding a reinforcing rod 123, which improves the connection strength and reduces the possibility of looseness.

Figure 1:
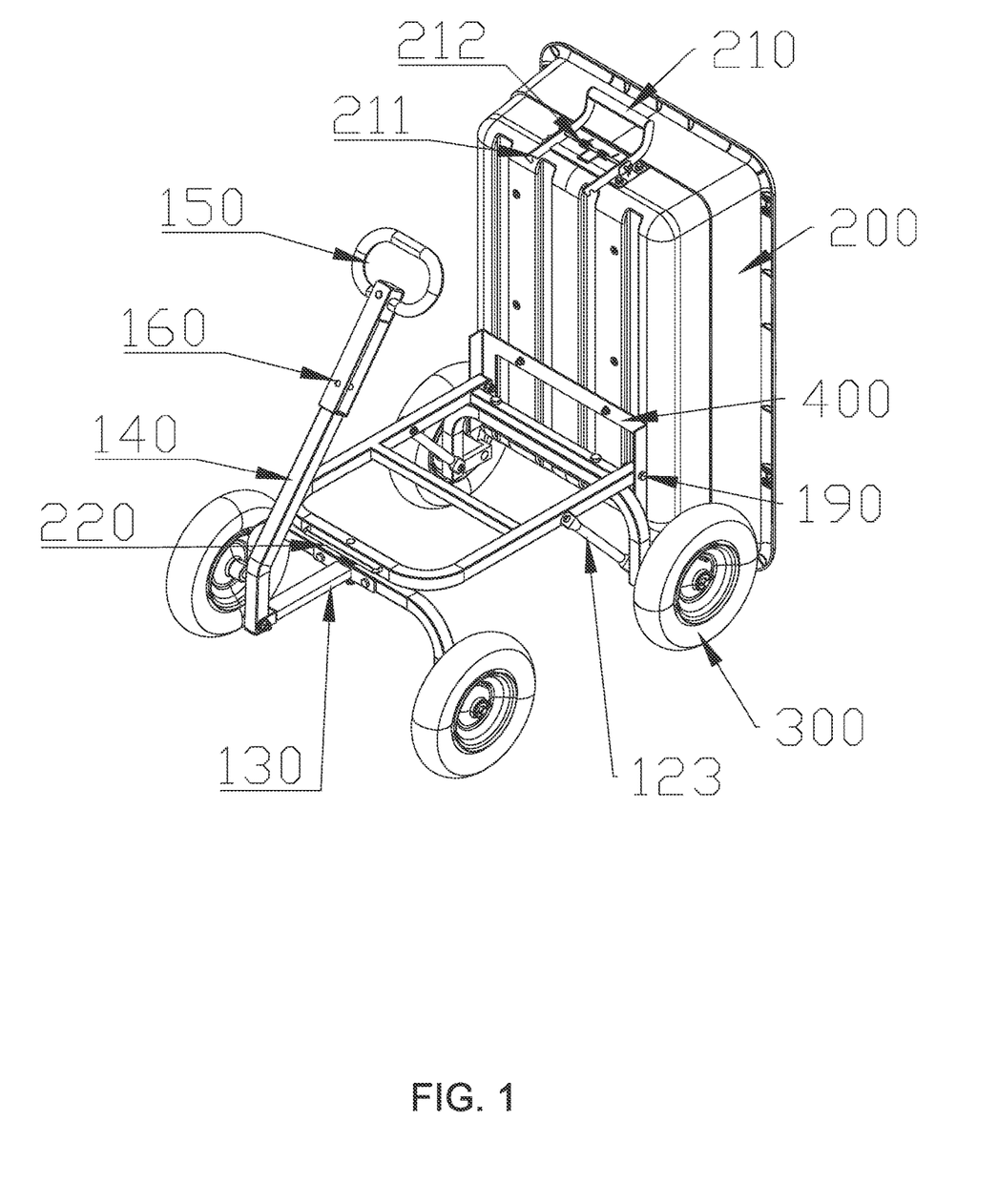
FIG. 1 is a schematic structural diagram of a novel tipcart according to a first embodiment of the present application.
Figure 6:
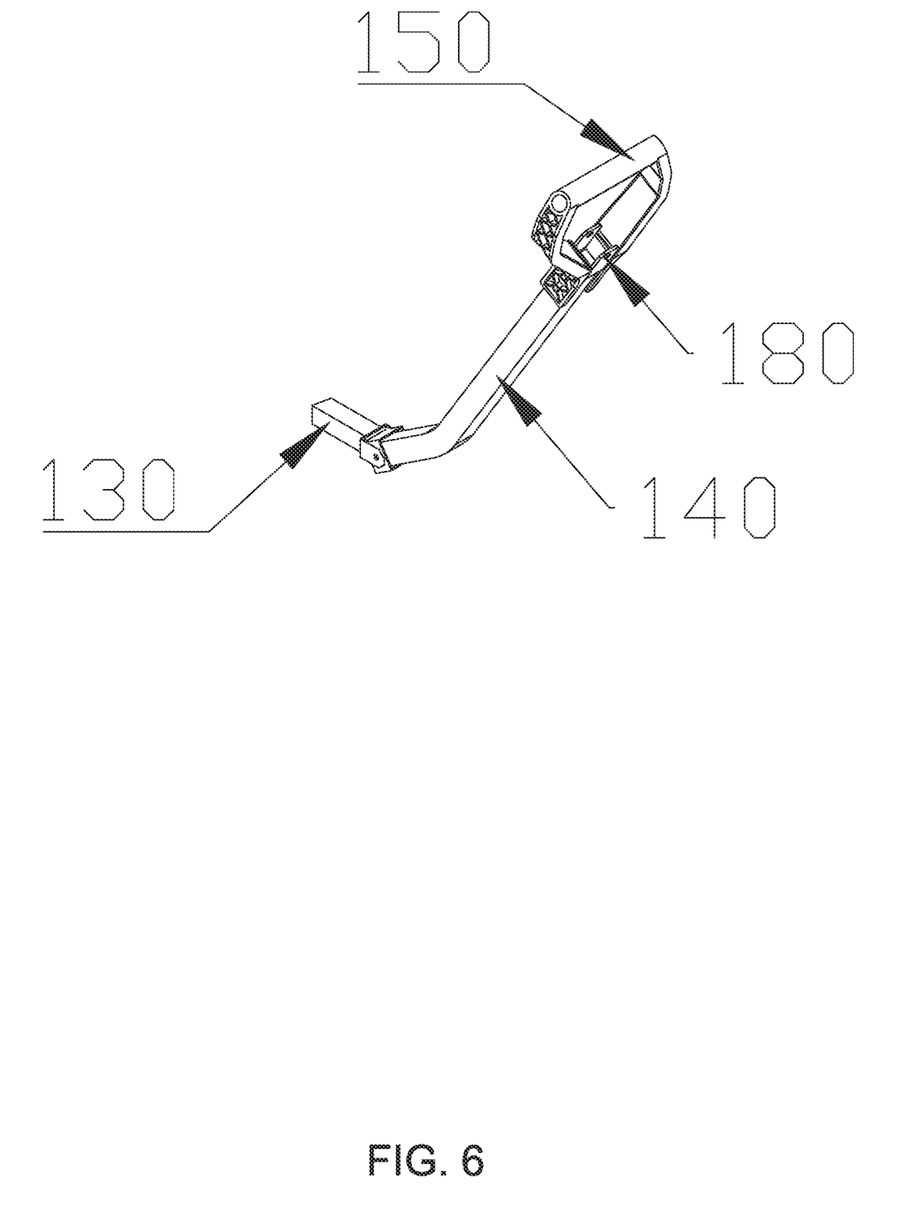
FIG. 6 is a schematic structural diagram of the handle according to an embodiment of the present application

Furthermore, a handle for pushing and pulling the tipcart is also fixedly connected to the frame 100, and the handle comprises a connecting rod 120 fixedly connected to the frame 100, an extension rod 140 hinged on the end of the connecting rod 130, and a hand pull ring 150 connected to the extension rod 140. The connecting rod 130 is horizontally fixed on the side of the front end of the frame 100 or the side of the front wheel bracket 110. The other end of the connecting rod 130 is hinged with one end of the extension rod 140. The extension rod 140 is a V-shaped rod, which adapts to the push and pulls of people with different heights, and is convenient for storage at the same time. The other end of the extension rod 140 is detachably and fixedly connected with a hand pull ring 150, which facilitates grasping and improves the comfort of personnel when pushing and pulling.

Furthermore, a positioning hole is provided under the hand pull ring 150, a mounting hole 160 is provided on the extension rod 140, after a second pin shaft passes through the mounting hole 160 and the positioning hole, the second pin shaft detachably fixes the hand pull ring 150 on the extension rod 140.

Furthermore, two sets of the mounting holes 160 are arranged on the extension rod 140 at intervals, and a distance between the two sets of mounting holes 160 is not less than the height of the hand pull ring 150. Each set of mounting holes 160 includes two mounting holes 160 disposed opposite to both sides of the extension rod 140. When the hand pull ring 150 is fixed in the upper mounting hole 160 through the second pin shaft, the hand pull ring 150 is located at the end of the extension rod 140 and higher than the extension rod 140, which is convenient for manual pushing and pulling. When the hand pull ring 150 is fixed in the lower mounting hole 160 through the second pin shaft, the hand pull ring 150 is located inside the extension rod 140, and the upper mounting hole 160 is higher than the highest point of the hand pull ring 150, which is convenient to hook onto a trailer for pushing and pulling. Therefore, by arranging two sets of mounting holes 160 and a detachable fixed hand pull ring 150 at the end of the extension rod 140, the applicable scope of the push-pull method of the tipcart is increased.

Furthermore, the bottom of the hand pull ring 150 is fixedly connected with a limiting rod 170, and a limiting hole is provided in the corresponding extension rod 140, and the limiting rod 170 extends into the limiting hole so that the hand pull ring 150 is slidably connected to the extension rod 140. By arranging the slidably connected limit rod 170 and the limit hole, it is convenient to quickly change the position of the hand pull ring 150, and the installation efficiency is improved.

Figure 2:
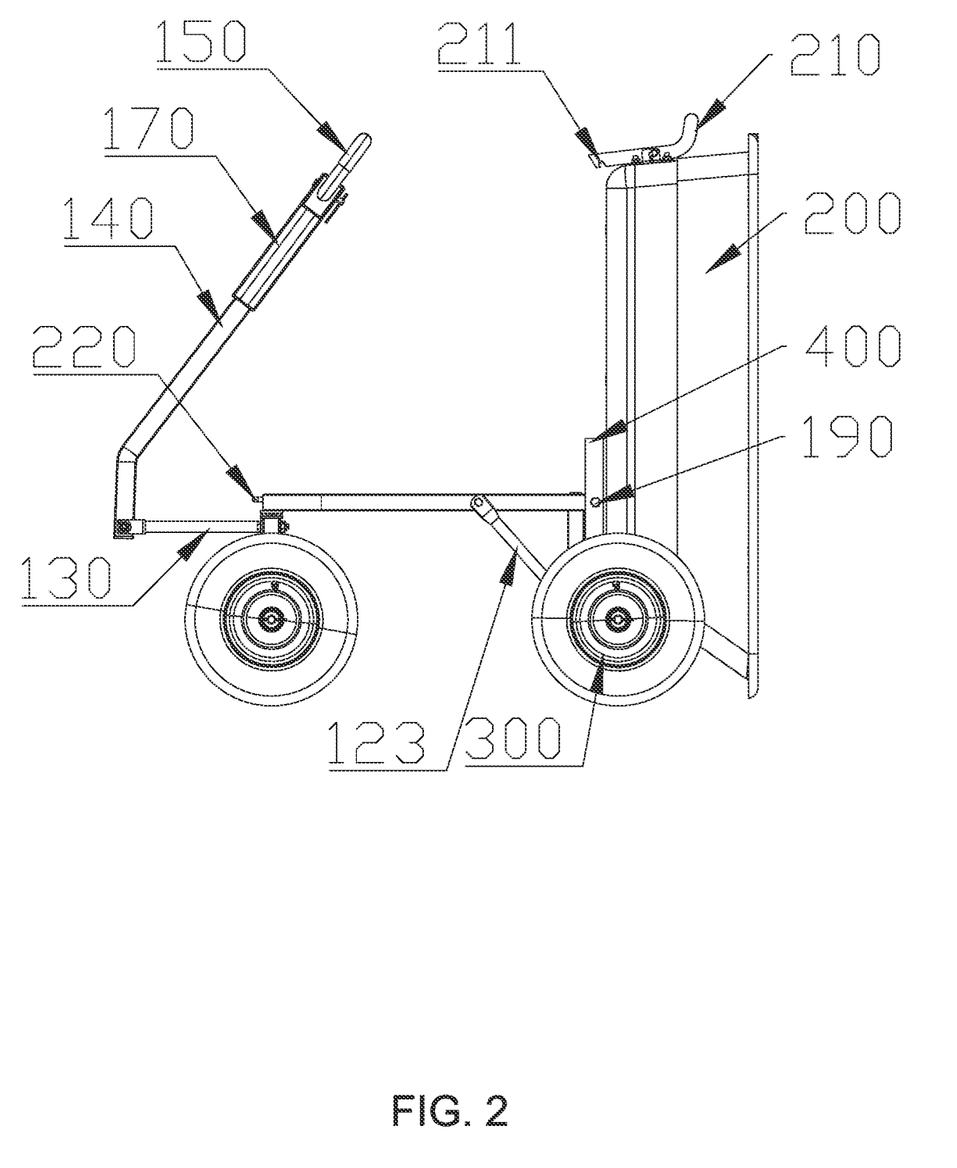
FIG. 2 is a front view schematic structural diagram of a novel tipcart according to a first embodiment of the present application.
Figure 3:
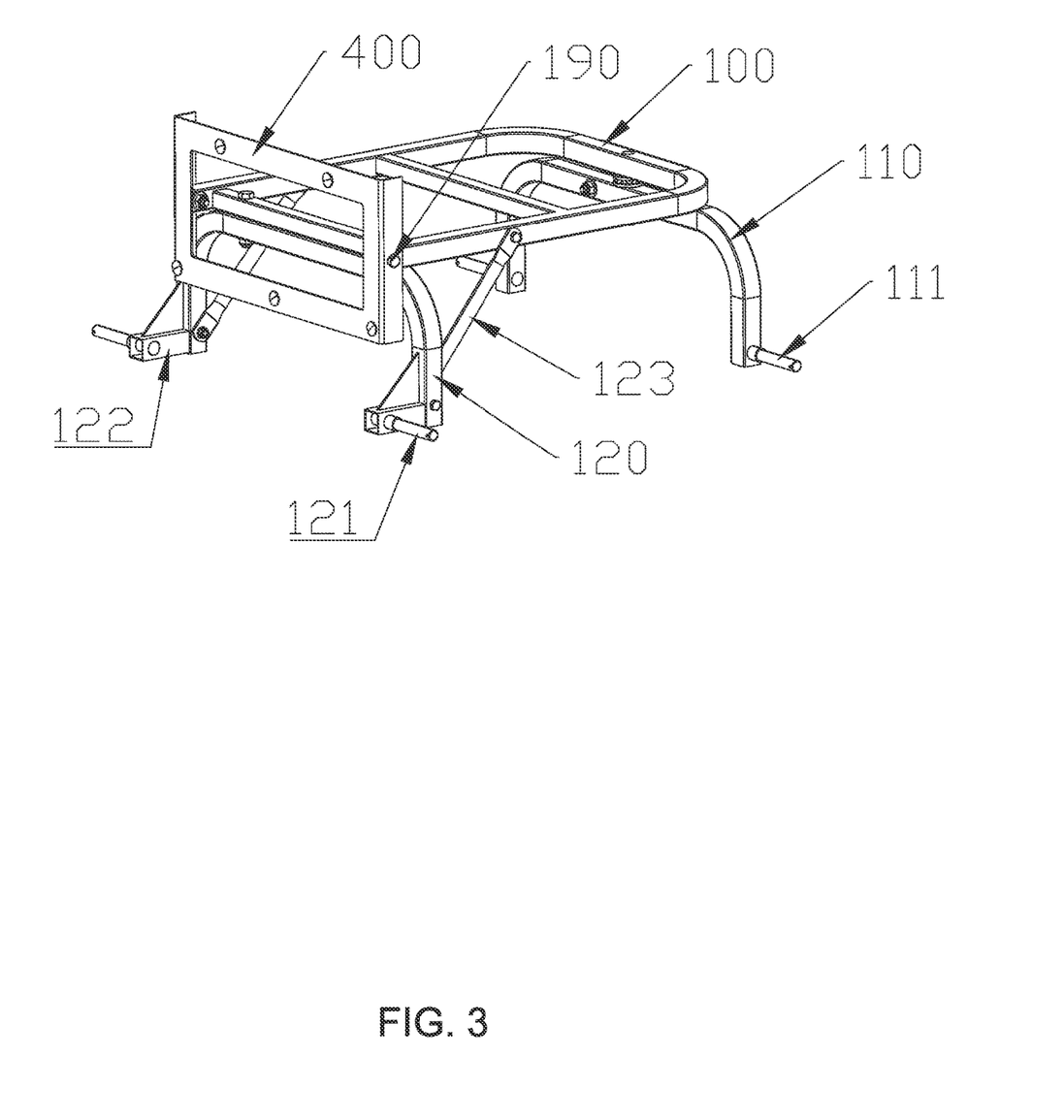
FIG. 3 is a schematic structural diagram of a novel tipcart according to the first embodiment of the present application after removing the dump box, wheels and handles.
Figure 4:
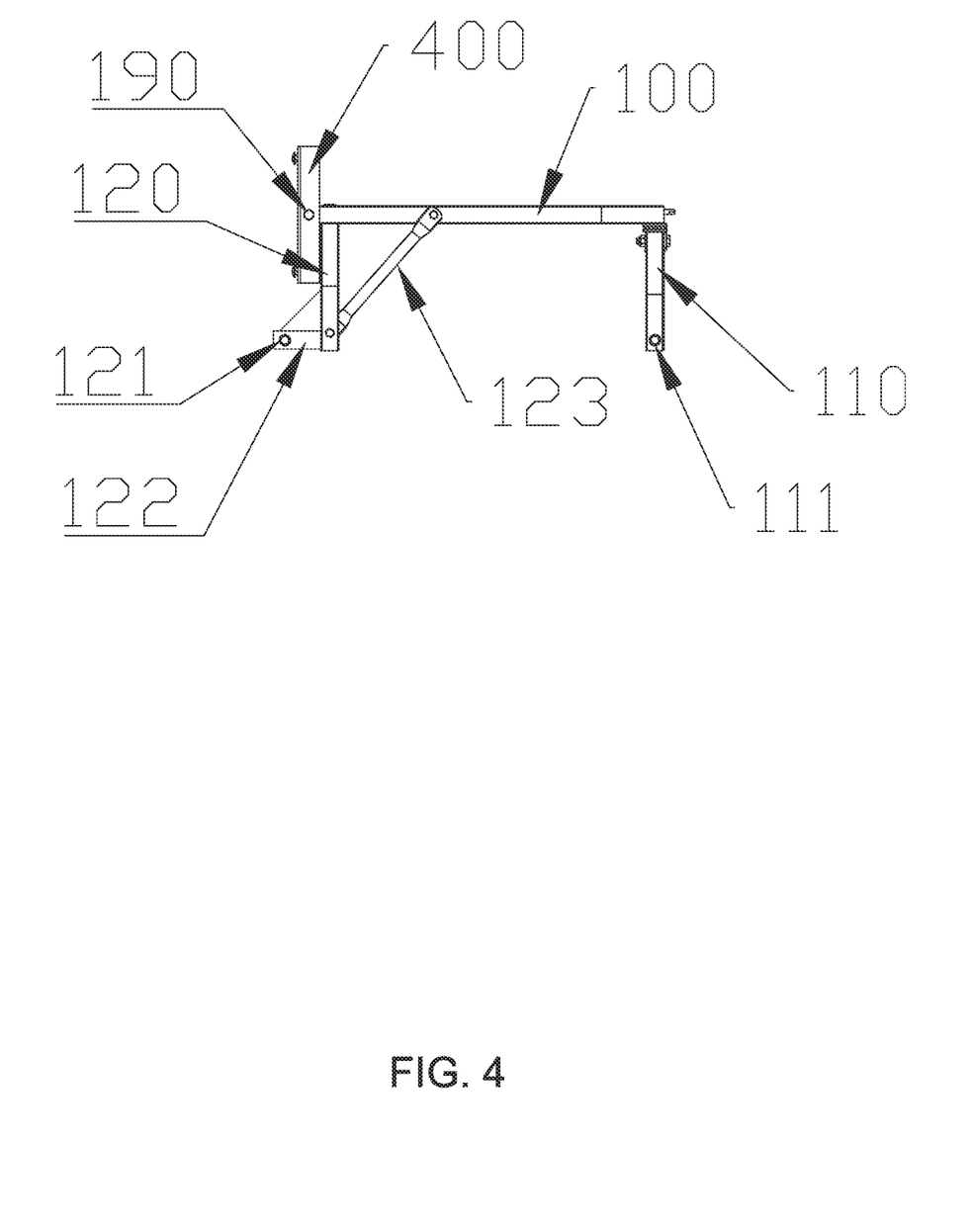
FIG. 4 is a front view schematic structural diagram of a novel tipcart according to an embodiment of the present application after removing the dump box, wheels and handles.
Figure 5:
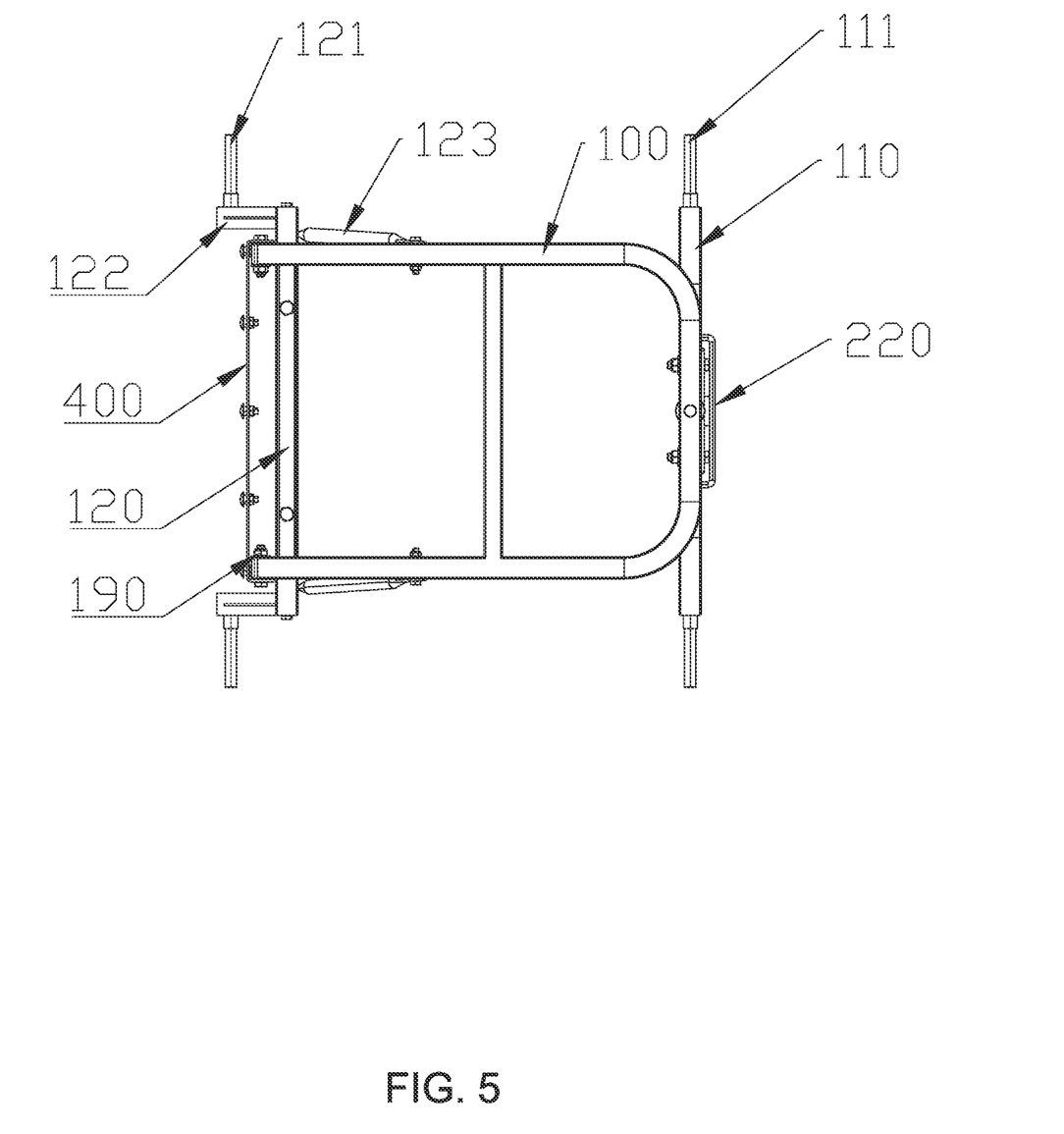
FIG. 5 is a top view schematic structural diagram of a novel tipcart according to an embodiment of the present application after removing the dump box, wheels and handles.

Furthermore, the front end of the dump box 200 is provided with a handle 210 for easily dumping the dump box 200, and an clip 211 for clipping the dump box 200 on the frame 100 is recessed inwardly under the handle 210, a clip ring 220 for connecting the clip 211 is provided on the frame 100, the clip 211 and the clip ring 220 are fixedly connected in a detachable manner, and the handle 210 and the dump box 200 are hingedly connected by a third pin shaft, and a return spring 212 for maintaining the handle 210 in a clipping position is sleeved on the third pin shaft.

Embodiment 2

The structure of the tipcart of this embodiment is basically the same as that of the previous embodiment, and the difference is only in that: as shown in the figure, the lower part of the handle ring 150 is rotatably connected with the extension rod 140, and the end of the extension rod 140 is provided with a connecting hole 180 for connecting a trailer. When the hand pull ring 150 is rotated to the same horizontal plane as the extension direction of the extension rod 140, the connecting hole 180 is located inside the hand pull ring 150, which is convenient for manually pulling the hand pull ring 150 to operate the tipcart. When the hand pull ring 150 is rotated to a position close to the extension rod 140, the connecting hole 180 is exposed at this time, which is convenient for hooking the trailer for pushing and pulling. Therefore, by providing the rotatable hand pull ring 150 and the connecting hole 180 at the end of the extension rod 140, the applicable range of the push-pull method of the tipcart is improved.

The application has been described in detail above. The above is only the preferred embodiment of the application, and should not limit the scope of implementation of the application, that is, all equivalent changes and modifications made according to the scope of the application should still belong to the scope of the application.

What is claimed is:

1. A tipcart, comprising a frame, a dump box hinged on the frame, and a first pin shaft for connecting the frame and the dump box,
    a front wheel bracket and a rear wheel bracket are respectively fixedly connected under a front and rear ends of the frame, both ends of the front wheel bracket and the rear wheel bracket are respectively provided with a front wheel mounting shaft and a rear wheel mounting shaft, and wheels are mounted on both the front wheel mounting shaft and the rear wheel mounting shaft,
    the first pin shaft is arranged at a rear end of the frame, and the first pin shaft is located between the front wheel mounting shaft and the rear wheel mounting shaft;
    wherein an end of the rear wheel bracket is horizontally extended backward to form an extension frame for mounting the rear wheel mounting shaft, the first pin shaft is arranged between the rear wheel bracket and the rear wheel mounting shaft,
    wherein during a dumping of the dump box, the gravity of which moves down into a triangular area formed by the rear wheel bracket, the rear wheel mounting shaft and the first pin shaft;
    wherein a connecting plate is fixedly arranged under a rear end of the dump box, and left and right ends of the connecting plate extend downward to form a hinge plate, wherein the hinge plate is provided with a hinge hole, and the first pin shaft passes through the hinge hole to hinge the connecting plate and the frame, and the connecting plate rotates with a rotation of the dump box;
    wherein the front wheel bracket and the rear wheel bracket are both U-shaped brackets.

2. The tipcart according to claim 1, wherein the hinge hole is arranged in a middle position of the hinge plate.

3. The tipcart according to claim 2, wherein the connecting plate is a frame structure with a hollow center.

4. The tipcart according to claim 1, wherein a reinforcing rod is also fixedly connected between the rear wheel bracket and the frame, and the reinforcing rod, the rear wheel bracket and the frame are jointly enclosed to form a triangular support structure.

5. The tipcart according to claim 1, wherein a handle for pushing and pulling the tipcart is also fixedly connected to the frame, and the handle comprises a connecting rod fixedly connected to the frame, an extension rod hinged on an end of the connecting rod, and a hand pull ring connected to the extension rod.

6. The tipcart according to claim 5, wherein a positioning hole is provided under the hand pull ring, a mounting hole is provided on the extension rod, after a second pin shaft passes through the mounting hole and the positioning hole, the second pin shaft detachably fixes the hand pull ring on the extension rod, two sets of the mounting holes are arranged on the extension rod at intervals, and a distance between the two sets of mounting holes is not less than a height of the hand pull ring,
a bottom of the hand pull ring is fixedly connected with a limiting rod, and a limiting hole is provided in the corresponding extension rod, and the limiting rod extends into the limiting hole so that the hand pull ring is slidably connected to the extension rod.

7. The tipcart according to claim 5, wherein a lower part of the hand pull ring is rotatably connected with an extension rod, and an end of the extension rod is provided with a connection hole for connecting a trailer.

8. The tipcart according to claim 1, wherein a front end of the dump box is provided with a handle for easily dumping the dump box, and a clip for clipping the dump box on the frame is recessed inwardly under the handle,
a clip ring for connecting the clip is provided on the frame, the clip and the clip ring are fixedly connected in a detachable manner, and the handle and the dump box are hingedly connected by a third pin shaft, and a return spring for maintaining the handle in a clipping position is sleeved on the third pin shaft.

* * * * *